US010385902B2

(12) United States Patent
Wunderlich et al.

(10) Patent No.: US 10,385,902 B2
(45) Date of Patent: Aug. 20, 2019

(54) SCREW AND DRIVE ELEMENT WITH CHAMFER (71) Applicant: ADOLF WÜRTH GMBH & CO. KG, Künzelsau (DE)

(72) Inventors: Andreas Wunderlich, Kupferzell (DE); Johannes Starke, Ellhofen (DE)

(73) Assignee: ADOLF WÜRTH GMBH & CO., KG (DE)

( * ) Notice: Subject to any disclaimer, the term of this patent is extended or adjusted under 35 U.S.C. 154(b) by 242 days.

(21) Appl. No.: 15/101,872

(22) PCT Filed: Nov. 26, 2014

(86) PCT No.: PCT/EP2014/075682
§ 371 (c)(1),
(2) Date: Jun. 3, 2016

(87) PCT Pub. No.: WO2015/082283
PCT Pub. Date: Jun. 11, 2015

(65) Prior Publication Data
US 2016/0305462 A1 Oct. 20, 2016

(30) Foreign Application Priority Data

Dec. 3, 2013 (DE) .......................... 10 2013 113 401

(51) Int. Cl.
*F16B 23/00* (2006.01)
*B25B 15/00* (2006.01)
(Continued)

(52) U.S. Cl.
CPC ........ *F16B 23/0053* (2013.01); *B25B 15/005* (2013.01); *B25B 15/008* (2013.01);
(Continued)

(58) Field of Classification Search
CPC ................ F16B 23/0053; F16B 23/003; F16B 25/0015; F16B 25/0021; F16B 25/103;
(Continued)

(56) References Cited

U.S. PATENT DOCUMENTS 3,122,963 A * 3/1964 Borgeson .............. B25B 15/005
411/404
4,464,957 A 8/1984 Gill
(Continued)

FOREIGN PATENT DOCUMENTS

DE 39 11 409 A1 10/1990
EP 0488541 A1 6/1991
(Continued)

OTHER PUBLICATIONS

International Search Report for PCT/EP2014/075682 (3 pgs).

*Primary Examiner* — Robert J Scruggs
(74) *Attorney, Agent, or Firm* — Brinks Gilson & Lione; Ryan L. Marshall; Erik Bokar (57) ABSTRACT Screw for introducing into an underground, comprising a screw shaft and a screw head which is adjoining the screw shaft, in which a drive is formed for rotary driving the screw by a drive element, wherein the drive comprises a hollow wing section at an outer side of the screw with a circular hollow core and hollow wings which are provided along the circumference, wherein the drive comprises a hollow recess section at an inner side of the screw, and wherein the drive at a transition between the hollow wing section and the hollow recess section comprises a chamfer section whose outer surface is angled with respect to an outer surface of the hollow wing section and with respect to an outer surface of the hollow recess section.

22 Claims, 7 Drawing Sheets (51) Int. Cl.
*B25B 21/00* (2006.01)
*F16B 25/00* (2006.01)
*F16B 25/10* (2006.01)

(52) U.S. Cl.
CPC ............ *B25B 21/00* (2013.01); *F16B 23/003* (2013.01); *F16B 25/0015* (2013.01); *F16B 25/0021* (2013.01); *F16B 25/103* (2013.01)

(58) Field of Classification Search
CPC ..... B25B 15/005; B25B 15/008; B25B 21/00; B25B 13/48; B25B 13/481; B25B 13/5091; B25B 17/00; E21B 19/16
See application file for complete search history.

(56) References Cited

U.S. PATENT DOCUMENTS

| | | |
|---|---|---|
| 5,279,190 A | 1/1994 | Goss et al. |
| 5,435,680 A | 7/1995 | Schuster |
| 5,553,983 A | 9/1996 | Shinjo |
| 6,886,433 B2 | 5/2005 | Totsu |
| 6,951,158 B1 | 10/2005 | Edland |
| 7,730,812 B2 * | 6/2010 | Edland ................. B25B 15/005 411/404 |
| 2005/0172762 A1 * | 8/2005 | Suzuki ................. B25B 15/005 81/460 |
| 2011/0182696 A1 * | 7/2011 | Ogawa ................ F16B 23/0023 411/404 |
| 2016/0305462 A1 | 10/2016 | Wunderlich et al. |

FOREIGN PATENT DOCUMENTS

| | | |
|---|---|---|
| EP | 0933538 A1 | 6/1997 |
| EP | 0 984 175 A1 | 3/2000 |
| EP | 1 245 839 A1 | 12/2000 |
| JP | H06159339 A | 6/1994 |
| RU | 126 777 U1 | 4/2013 |
| TW | 200525090 | 8/2005 |
| WO | WO 2004/065803 A1 | 1/2004 |
| WO | WO 2015/082283 A1 | 6/2015 |

\* cited by examiner

SCREW AND DRIVE ELEMENT WITH CHAMFER

REFERENCE TO EARLIER FILED APPLICATIONS

This application claims the benefit of the filing date of German Patent Application No. 10 2013 113 401.7 filed 3 Dec. 2013, the disclosure of which is hereby incorporated herein by reference.

TECHNICAL FIELD

The invention relates to a screw, a drive element, an arrangement and a method for introducing a screw into an underground.

TECHNOLOGICAL BACKGROUND

Conventional screws and fixing elements, respectively, are known from DE 69308484 T2, U.S. Pat. No. 6,951,158, EP 0,933,538 A1, DE 4244989 C2 and EP 0,488,541 A1.

As components of a drive element which functionality act on a recess profile of a fixing element, according to U.S. Pat. No. 4,464,957, wing surfaces only serve in an inclined section of the drive element.

EP 0,524,617 A1 discloses a screw which contains a recess for its drive which comprises an outer contour which deviates from the circular form. In the radial inner region and/or in the radial outer region of the recess, the side walls are formed from single surfaces which are located on a cone surface.

In particular, screws with a so-called AW-drive are commercially available, which is formed as internal hexalobular with six circumferentially distributed wings and which in addition is penetrated by a truncated cone which ends at the inner diameter of the internal hexalobular at the bottom of the drive.

Although the screws known from prior art have proved to be efficient, they can be prone to an undesirably breaking or shearing-off under heavy load or unfavorable surrounding circumstances in some cases. There is also still room for further improvement with respect to the ability of such a screw to be guided and centered by a drive element like a bit.

SUMMARY OF THE INVENTION

There may be a need for a screw and an associated drive element which have good properties with respect to the ability of the screw to be guided and centered, and provide a reliable protection of the screw head of the screw and the drive element against shearing-off.

The subject-matters with the features according to the independent patent claims is provided. Further embodiments are shown in the dependent claims.

According to an embodiment of the present invention, a screw (for example made of metal) for introducing into an underground is provided, wherein the screw comprises a screw shaft and a screw head which is adjoining the screw shaft (directly, i.e. without an intermediate component, or indirectly, i.e. with one or multiple intermediate components between the screw shaft and the screw head), in which screw head a drive (as specially formed cavity which is delimited by a wall of the screw head, and in which a correspondingly formed drive element for rotary driving the screw can form-lockingly engage, in order to transmit a torque from the rotating drive element to the screw) is formed for rotary driving the screw by a drive element, wherein the drive comprises a hollow wing section at an outer side of the screw (in particular directly adjoining an exterior of the screw and transitioning to the exterior of the screw) with a circular hollow core and hollow wings which are provided along the circumference (in particular such that the hollow wings descriptively modulate a circumference profile on the imaginary circular hollow core), wherein the drive comprises a hollow recess section (which in particular may be formed as hollow cone section) at an inner side of the screw (in particular forming the bottom of the drive in the screw head), and wherein the drive at a transition (in an axial direction) between the hollow wing section and the hollow recess section comprises a chamfer section (a section with a fully circumferentially or at least in sections circumferentially surrounding chamfer, more particularly a, in a cross-section planar, flattening of the transition between the hollow wing section and the hollow recess section), whose outer surface is angled and tilted, respectively, with respect to an outer surface of the hollow wing section (in particular inwardly with respect to a screw axis) and with respect to an outer surface of the hollow recess section (in particular outwardly with respect to a screw axis).

According to a further embodiment of the present invention, a drive element (for example at least partially made of metal) is provided for rotary driving a screw, in particular a screw with the above described features for introducing into an underground, wherein the drive element comprises a wing section with circular core and wings provided along the circumference (in particular such that the wings descriptively modulate a circumference profile on the imaginary circular core), a recess section at an end side (in particular a cone section), and a chamfer section (in particular a section with a fully circumferentially or at least in sections circumferentially surrounding chamfer, more particularly a, in the cross-section planar, flattening of the transition between the wing section and the recess section) at a transition (in the axial direction) between the wing section and the recess section, wherein an outer surface of the chamfer section is angled with respect to an outer surface of the wing section (in particular inwardly with respect to a rotation axis of the drive element) and with respect to an outer surface of the recess section (in particular inwardly with respect to a rotation axis of the drive element).

According to yet another embodiment of the present invention, an arrangement for introducing a screw into an underground is provided, wherein the arrangement comprises the screw with the above described features and a drive element with the above described features for rotary driving the screw for introducing the screw into the underground (wherein the drive element and the drive of the screw may be formed with a substantially inverse form with respect to each other and, except of a clearance due to technical reasons and a tolerance due to manufacturing, respectively, may comprise substantially same dimensions).

According to a yet further embodiment of the invention, a method for introducing a screw with the above described features into an underground by means of a drive element with the above described features is provided, wherein in the method, the hollow wings of the hollow wing section of the screw are engaged with the wings of the wing section of the drive element, the extensions of the hollow wings in the chamfer section of the screw are engaged with the extensions of the wings of the chamfer section of the drive element, and the screw is rotary driven by the drive element.

In the context of this application, the term "wing" denotes each contour, each form feature, each profile, and each structural discontinuity at an otherwise circular cross-section of a drive of a screw and a corresponding drive element, respectively, for rotary driving the screw, which forms an outer contour (of the drive element) and an inner contour (of the drive in the screw head), respectively, which deviates from the circular form and cylindrical form, respectively. Such wings may be formed as at least in sections round (for example semicircle shaped) and/or at least in sections cornered (for example polygonal) bulges and indentations, respectively, and may be arranged symmetrically or asymmetrically around the circumference, in particular equidistant to each other. For example, two opposing hollow wings of the drive may form a longitudinal slit, four hollow wings which are pairwisely opposing each other may form a cross slit, or six circumferentially distributed and at least in sections round hollow wings may form an internal hexalobular. Correspondingly, two opposing wings of the drive element may form a slit shaped longitudinal body, four opposing wings may form a cross body, or six circumferentially distributed and at least in sections round wings may form an internal hexalobular body.

According to an embodiment of the present invention, by providing a chamfer at an interface between profiled hollow wings and a, preferably non-profiled, hollow recess, it is possible to provide a wing profile which is especially long and elongated, respectively, in the axial direction of the screw, without that thereby a core diameter of the hollow wings assumes an extensively large dimension. By a wing profile which is elongated in the axial direction, an undesired tilting of a correspondingly formed drive element, when engaging in the drive of the screw, can be prevented and thereby a proper guiding and centering of the screw can be ensured, when introducing into the underground by the drive element. By keeping the core diameter of the hollow wings in limits and by preventing from an extensively large dimension, respectively, and also due to the described configuration of the drive, a sufficiently large remaining bottom thickness of the screw between the drive and an outer side of the screw head can be maintained, also the tendency of the screw for undesirably shearing-off, when actuating by the drive element, is very low. At the same time, a large torque can be transmitted from the drive element to the screw.

DETAILED DESCRIPTION OF EXEMPLARY EMBODIMENTS

In the following, additional exemplary embodiments of the screw, the drive element, the method and the arrangement are described.

According to an exemplary embodiment, at the drive, the hollow wing section at the outer side of the screw may comprise a cylindrical shape at the outer side and a truncated cone shape at the inner side, the chamfer section may comprise a truncated cone shape respectively at the outer side and the inner side, and the hollow recess section may comprise merely a cone shape. In a corresponding manner, at the drive element, the wing section may comprise a cylindrical shape at the outer side and a truncated cone shape at the inner side, the chamfer section may comprise a truncated cone shape respectively at the outer side and at the inner side, and the recess section may comprise merely a cone shape. In particular, at the chamfer section of the drive (and at the chamfer section of the drive element), the smaller diameter of both truncated cones may be equal, such that descriptively both at a location are located radially on a same height. It has turned out, that such a design at a high robustness leads to an excellent torque transmission and to a secure grip.

According to an exemplary embodiment of the screw, extensions of the hollow wings may extend up into the chamfer section. In a corresponding manner, at the drive element, extensions of the wings may extend up into the chamfer section. Descriptively, according to the invention, thus the axial length of the radial bumps may be enlarged beyond the hollow wing section and the wing section, respectively. Therefore, a screw can be provided which is well guidable and at the same time is protected against shearing-off.

According to an exemplary embodiment of the screw, the hollow recess section (in particular formed as hollow cone section) may be free from hollow wings. In a corresponding manner, at the drive element, the recess section (in particular formed as cone section) may be free from wings. Thus, within the hollow recess section, the inner surface may be free from elevations and in the recess section, the outer surface may be free from elevations and smooth, respectively. Thereby, also an undesired contact between the bottom of the drive element and the bottom of the drive can be prevented and thereby a guiding of the screw, which is secured against tilting, by the drive element can be ensured.

According to an exemplary embodiment of the screw, the hollow wings may—along the screw axis—from an end of the hollow wing section at an outer side of the screw up to a beginning of the chamfer section, have a constant and consistent outer diameter. In a corresponding manner, at the drive element the wings may—along the rotation axis of the drive element—from an end of the wing section which is facing away from the drive of the screw during the rotary operation up to the beginning of the chamfer section, have a constant and consistent outer diameter. Thereby, an efficient force transmission from the wings to the profiled wall of the screw which is adjoining the hollow wing sections is ensured by providing a consistently large contact surface in the axial direction between the hollow wings and the wings.

According to an exemplary embodiment of the screw, the hollow core of the hollow wing section may be, in particular conically, tapering towards the bottom of the drive. In a corresponding manner, at the drive element, the core of the wing section may be, in particular conically, tapering towards the recess section. Such a conically tapering ensures an automatic self-centering and self-guiding, respectively, of the drive element when inserting into the drive of the screw head.

According to an exemplary embodiment of the screw, an opening angle of a cone which is extrapolated from the chamfer section (and from an envelope of a part of the chamfer section which is axially tapering, respectively) may be larger than an opening angle of a cone which is extrapolated from the hollow wing section (and from an envelope of a part of the hollow wing section which is axially tapering, respectively). In a corresponding manner, at the drive element, an opening angle of a cone which is extrapolated from the chamfer section (and from an envelope of a part of the chamfer section which is axially tapering, respectively) may be larger than an opening angle of a cone which is extrapolated from the wing section (and from an envelope of a part of the wing section which is axially tapering, respectively). When the hollow core of the hollow wing section is tapering towards the interior of the screw, it may (regardless of the tapering-free design of the hollow wings and the wings, respectively) be denoted as hollow truncated cone shaped, and to this shape a corresponding cone can be assigned.

According to an exemplary embodiment, an opening angle of the hollow recess section which is formed as hollow cone section is larger than an opening angle of a cone which is extrapolated from the chamfer section of the screw. In a corresponding manner, at that drive element, an opening angle of the recess section which is formed as cone section may be larger than an opening angle of a cone which is extrapolated from the chamfer section of the drive element. Descriptively, therefore the cone slope in the region of the hollow wing section may be steeper (and closer to the screw axis, respectively) than in the region of the chamfer section, and at the same time in the region of the chamfer section steeper (and closer to the screw axis, respectively) than in the hollow cone section. Thereby, an indeed stage-like but gentle adaptation of the slope of the wall in the drive is enabled. The same applies for the adaptation of the slope of the single sections in the drive element.

According to an exemplary embodiment of the screw, the outer surface of the chamfer section (and the axially tapering part of the outer surface of the chamfer section, respectively) may be located on a cone with an opening angle in a range between approximately 50° and approximately 130°, in particular with an opening angle in a range between approximately 60° and approximately 120°, more particularly with an opening angle in a range between approximately 80° and approximately 100°. In particular a chamfer opening angle at the drive of approximately 90° (which corresponds to a chamfer of approximately 45° with respect to a screw axis) has turned out as especially advantageous. In a corresponding manner, at the drive element, the outer surface of the chamfer section (and the axially tapering part of the outer surface of the chamfer section) may be located on a cone with an opening angle in a range between approximately 50° and approximately 130°, in particular with an opening angle in a range between approximately 60° and approximately 120°, more particularly with an opening angle in a range between approximately 80° and approximately 100°. In particular, a chamfer opening angle at the drive element of approximately 90° (which corresponds to a chamfer of approximately 45° with respect to a rotation axis of the drive element) has turned out as especially advantageous. Thereby, with a sufficiently big axial length of the section of the drive which is provided with hollow wings, a high and reproducible force transmission from the drive element to the screw can be effected without a mechanical overloading of the screw.

According to an exemplary embodiment of the screw, an opening angle of the hollow cone section may be in a range between approximately 100° and approximately 170°, in particular in a range between approximately 110° and approximately 170°, more particularly in a range between approximately 130° and approximately 150°. In a corresponding manner, at the drive element, an opening angle of the cone section may be in a range between approximately 100° and approximately 170°, in particular in a range between approximately 110° and approximately 170°, more particularly in a range between approximately 130° and approximately 150°. An angle of respectively ca. 140° has turned out as especially advantageous. By forming the cone section at the side of the bottom with a sufficiently large opening angle, the remaining bottom thickness between the bottom of the drive and the outer side of the screw head can be kept so large, that a screw breaking, when rotary actuating, is reliably avoided.

According to an exemplary embodiment of the screw, a ratio between a hollow wing outer diameter (thus a diameter at the location of the hollow wings where these have a maximum distance with respect to the screw axis) and a hollow wing inner diameter (thus a diameter at that location of the hollow wings where these have a minimum distance with respect to the screw axis) may be larger than approximately 1.42, in particular larger than approximately 1.44, more particularly in a range between approximately 1.43 and approximately 1.60. In a corresponding manner, at the drive element, a ratio between a wing outer diameter (thus a diameter at the location of the wings where these have a maximum distance with respect to the rotation axis of the drive element) and a wing inner diameter (thus a diameter at the location of the wing where these have a minimum distance with respect to the rotation axis of the drive element) may be larger than approximately 1.42, in particular larger than approximately 1.44, more particularly in a range between approximately 1.43 and approximately 1.60. The mentioned ratios preferably shall be larger than 1.40, in order to achieve an additional improvement of the guiding properties and the centering properties at a large torque transmission.

According to an exemplary embodiment of the screw, at a radially innermost section of one or more of the hollow wings, a respective wing edge (thus a location with an abrupt change of the slope in the wing course). In a corresponding manner, at the drive element, at a radially innermost section of at least a part of the wings, a respective wing edge may be formed, wherein the wing edge is in particular formed of two surfaces sections which are abutting against each other and which are free from curvature at the border region, more particularly with a wing edge angle in a range between approximately 120° and approximately 160°. In contrast to a completely round design of the hollow wings/wings at the radially innermost section, by forming a wing edge at the intersection of two, at least in sections linear, lines with a preferably obtuse angle (for example in a range between 120° and 160°, a wing widening can be promoted, in order to design the ratio of the wing outer diameter with respect to the wing core diameter sufficiently large. Thereby, and undesired bearing of the drive element at the bottom of the drive can be made more improbable, which would cause a disturbance of the guiding of the screw by the drive element.

According to an exemplary embodiment of the screw, six wings may be arranged along the circumference (alternatively, also four or eight wings which are arranged along the circumference are possible, for example). In a corresponding manner, at the drive element, six wings may be arranged along the circumference. The resulting form at the outer side of the drive and at a corresponding location of the drive element may correspond to an internal hexalobular and a Torx®-geometry, for example.

According to an exemplary embodiment of the screw, the screw head may be a counter sunk head. Advantageously, when forming the screw head as countersunk head, an opening angle of the outer surface of the countersunk head may be formed such that it deviates from an opening angle of a cone which is assigned to the chamfer section of the screw preferably less than 10°, further preferably less than 5°. Thus, and undesired extensive reduction of the remaining bottom thickness of the screw can be avoided and therefore a break-proof screw can be provided.

According to an exemplary embodiment, the screw, in particular a wood screw or a metal drilling screw, can be configured as self drilling (i.e. drilling a hole into the underground without pre-drilling) and/or a self cutting (i.e. cutting a thread into the underground with or without pre-drilling) screw. Especially in such screws, the requirements with regard to the ability to be guided and centered and with regard to the protection against shearing-off when high forces are acting during self drilling and self cutting, respectively, are especially important and the inventive measures are therefore especially effective.

According to an exemplary embodiment, the drive element can be configured as a bit. A bit in particular denotes an exchangeable screwdriver wing without a handle for a certain screw head profile. The, for example hexagonal, accommodation may be formed such that it can be form-lockingly inserted in a correspondingly formed bit holder (for example of a hand piece of a screwdriver or a battery-powered screwdriver).

According to another exemplary embodiment, the drive element may be configured as a wrench. A wrench may be a (for example substantially L-shaped) hand tool for tightening or loosening of screws with a fitting drive profile. Such a wrench can be put on the drive profile in the screw head can be actuated in the direction of rotation.

According to yet another exemplary embodiment, the drive element may be configured as screwdriver with a hand piece which can be rotary actuated by a user, which hand piece is adjoining the wing section. Such a screwdriver may be a tool with a certain head shape by which screws are screwed into or out of undergrounds and materials, respectively.

According to an exemplary embodiment, the screw and the drive element may be adapted to each other, such that, when engaging the drive element into the drive of the screw, a direct contact of a boundary wall of the hollow recess section is made impossible by means of the recess section. For example, during rotary operation, only the screw head wall at the hollow wing section and the wing section are contacting each other, and the screw head wall at the chamfer section of the screw and the chamfer section of the drive element are contacting each other, but not the boundary wall of the hollow recess section and the recess section. Thereby, a minimum distance of, for example, 0.2 mm up to 0.4 mm between the tip of the drive element and a bottom of the drive of the screw can always be maintained, for example. A contacting which is avoided by this measure, would negatively impair the guiding of the screw by the drive element.

The described architecture for forming a drive for a screw is compatible with different types of screws and with different forms of screw heads. As screws, both, such with a full thread or a partial thread at the screw shaft, or also drilling screws can be used. The inventive architecture is also especially advantageously utilizable for self drilling screws, since in these, a reliable guiding and centering during inserting is especially important. With regard to the head forms of inventive screws, both, countersunk head screws and such with head forms like that of the AMO-screw of the company Mirth can be utilized. Possible undergrounds in which the screw can be introduced, are wood, stone, concrete, metal, etc.

According to an exemplary embodiment, thus, descriptively the central region of the drive and the drive element, respectively, can be elongated, a (for example 45°—) chamfer can be attached and thereby an axial elongation of the wings and the hollow wings, respectively, can be achieved. Also a radial widening of the wings and the hollow wings, respectively, is possible. The flanks and ends, respectively, of the recesses may be arranged with an angle of for example 140°, in order to establish a compatibility with an internal hexalobular-bit.

Also a rounding of the front contour is advantageous, for example with a radius in a range between 0.1 mm and 0.4 mm, whereby the life quantity of an extrusion punch for manufacturing the screw can be increased.

According to an exemplary embodiment, the drive of the screw in a cross-sectional view has such a design, that originating from the hollow wing section at an outer side of the screw, it bends for the first time inwardly to the chamfer section which is directly (that is, without further intermediate section) adjoining, and originating from the chamfer section, it bends for a second time towards a hollow recess section at an inner side of the screw which is directly (that is, without further intermediate section) adjoining thereto, which hollow recess section in turn is running towards and end point at an inner side of the screw. In the cross-sectional view, the hollow wing section, the chamfer section, and the hollow recess section may each have a straight-lined outer contour. From the outside to the inside, in the cross-section, the drive may thus form a continuously concave structure without forming convex intermediate regions in sections (compare for example FIG. 1). Thereby, a simple construction with a axially long acting connection to a drive element is provided, without that a remaining bottom thickness of the screw had becomes too small (which in turn reduces the risk of undesired shearing-off). Since the hollow wings and their cantilevers, respectively, can be located radially far outside due to the described geometry, with such a screw, an especially large amount of torque can be transmitted.

According to an exemplary embodiment, in a corresponding manner, the drive element in a cross-sectional view has such a design that it, originating from a wing section which is at an outer side of the screw in operation, bends for a first time inwardly to the chamfer section which is directly (that is, without further intermediate section) adjoining, and originating from the chamfer section bends for a second time towards a recess section which is directly (that is, without further intermediate section) adjoining thereto, and which is at an inner side of the screw in operation, which recess section in turn is running towards an end point which is at an inner side of the screw in operation. In the cross-sectional view, the wing section, the chamfer section and the recess section may each have a straight-lined outer contour. From the outside to the inside, in the cross-section, the drive element may thus form a continuously convex structure without concave intermediate regions in sections (compare for example FIG. 6).

In the following, exemplary embodiments of the present invention are described in detail with reference to the following figures.

Before, referring to the figures, exemplary embodiments of the invention are described, some general aspects of the invention shall be explained:

In conventional screws, there is often the limitation that many drive sizes are required. When the ratio between a penetration depth of a cone or a truncated cone of a drive element with respect to the diameter of the cone or the truncated cone becomes too small at the tip (for example becomes <0.55), the guiding and centering of the screw by the drive element may become critical. Further, at screw diameters which are large with respect to the drive element, the breaking torque of the drive element is often small. Also, the remaining bottom thickness (i.e. a smallest distance between internal drive and an outer side of the head) may become critically small when the entry diameter and the penetration depth, respectively, is too large. Further, —in particular in self drilling screws—a higher torque transmission may be desired as achievable with conventional screws.

In the following, referring to the figures, a screw concept according to exemplary embodiments is described which overcomes the above limitations at least partially and fulfills the mentioned requirements, respectively.

Figure 1:
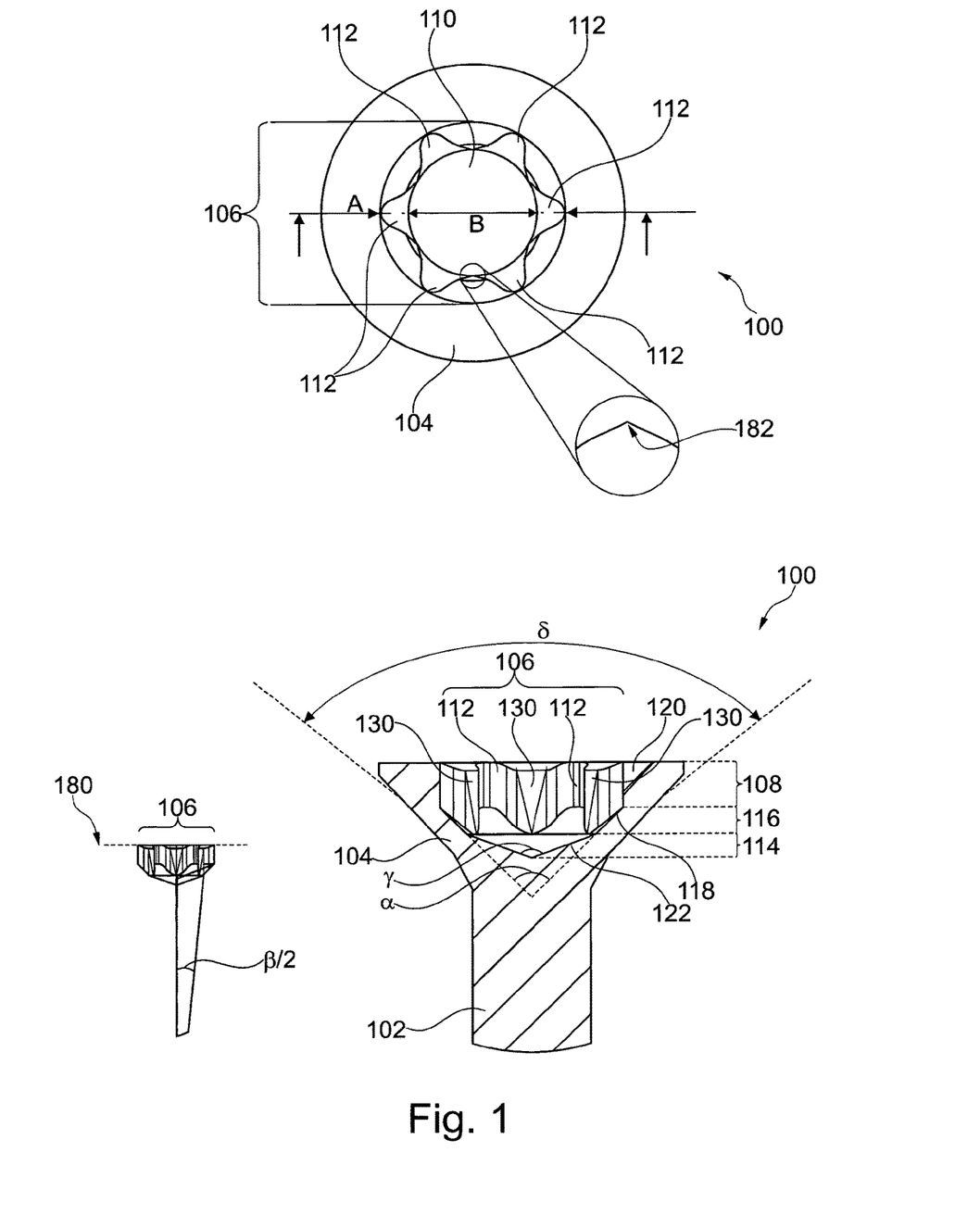
FIG. 1 shows a plan view and a cross-sectional view of a screw according to an exemplary embodiment of the invention.
Figure 1A:
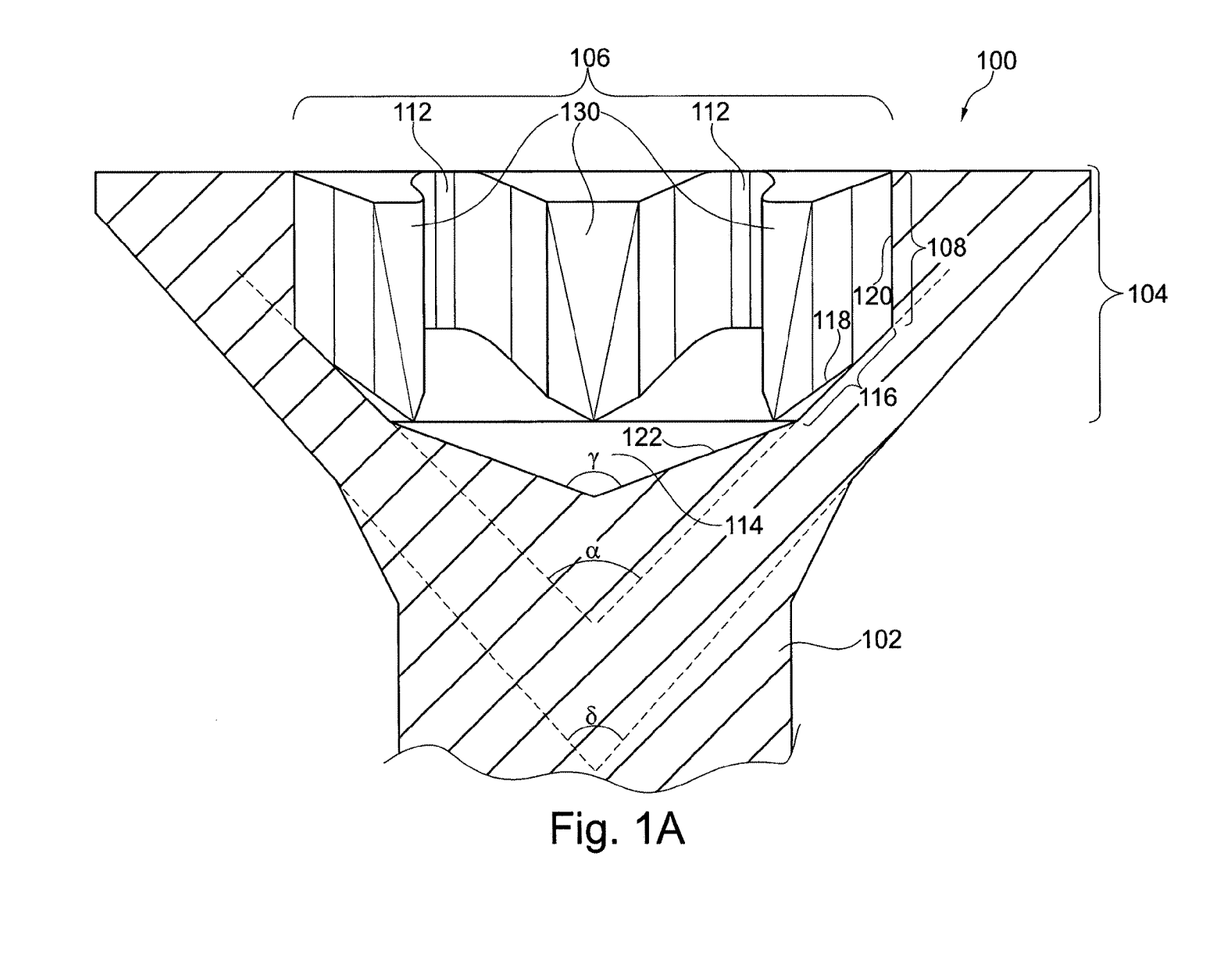
FIG. 1A shows an enlarged cross-sectional view of a screw head of the screw with a drive according to FIG. 1.

FIG. 1 shows a plan view and a cross-sectional view of a screw 100 according to an exemplary embodiment of the invention. FIG. 1A shows an enlarged cross-sectional view of a sub-portion of the screw 100 according to FIG. 1.

Figure 6:
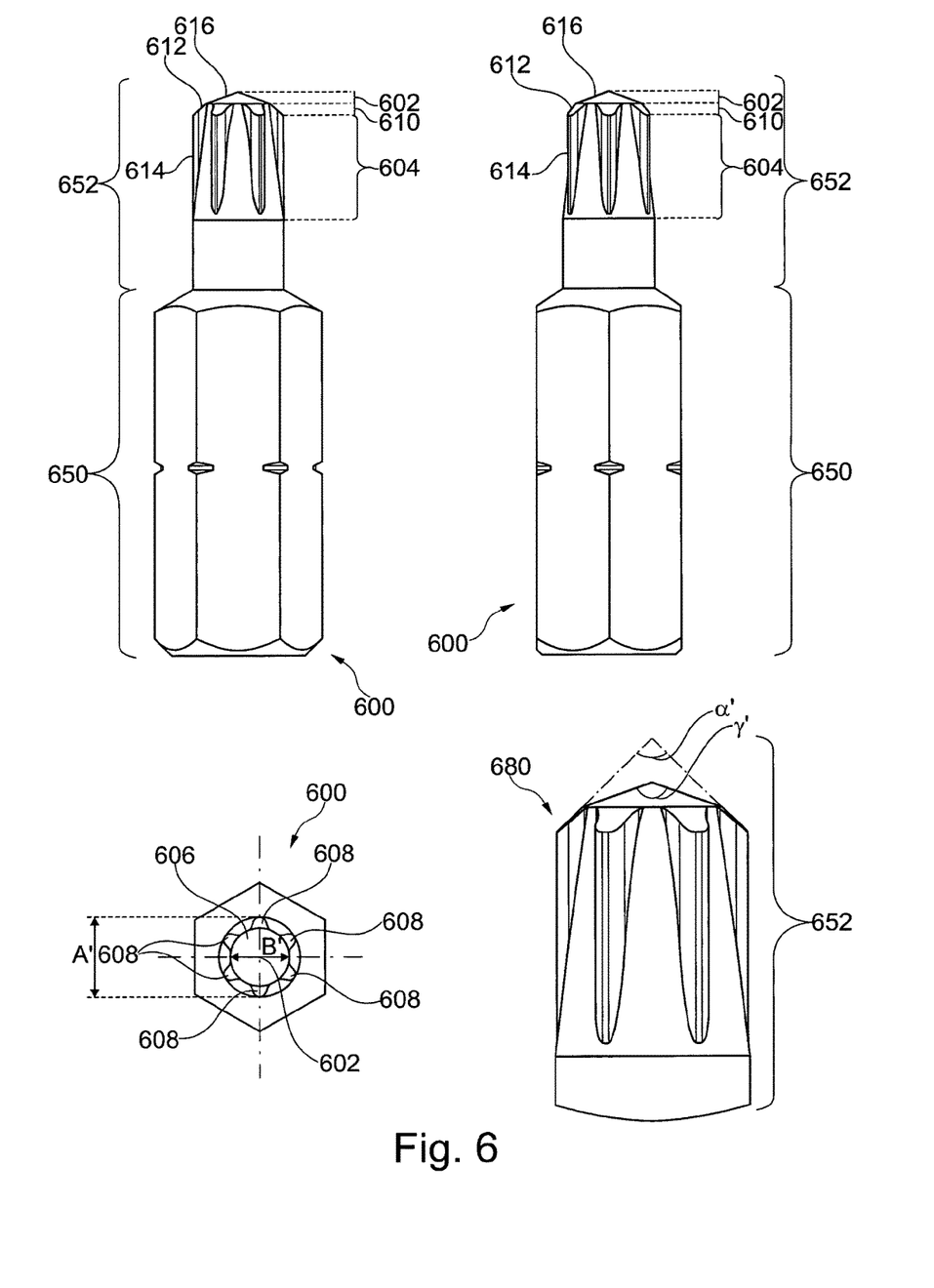
FIG. 6 shows two side views and a plan view of a drive element for driving a screw according to an exemplary embodiment of the invention Same or similar components in different figures are provided with the same reference signs.

The metallic screw 100 shown in FIG. 1 and FIG. 1A is configured for introducing into an underground (for example a wall) which is not shown in the figure, and is rotary drivable by a drive element 600 shown in FIG. 6. The, for example self drilling, screw 100 comprises a screw shaft 102 which is shown only schematically and in sections, respectively, which in an end-section may be tapering towards the end of the screw (not shown) towards a screw tip. An outer contour of the screw shaft 102 may comprise a thread, in particular a self cutting thread, in order to cut a thread into the underground in which the screw 100 is to be mounted.

At the screw shaft 102, a screw head 104 formed as a counter sunk head is axially adjoining—here directly (that is, without intermediate element or intermediate section) or alternatively indirectly (that is, with intermediate element or intermediate section), in which a drive 106 (i.e. a recess delimited in a special form in the screw head 104) for rotary driving the screw 100 by means of the drive element 600 shown in FIG. 6. By means of the drive 106 in the screw head 104, a drive profile is formed which may form-lockingly engage the drive element 600 with a clearance, in order to be able to transmit a drive force to the screw 100.

As can be easily seen in the plan view and the sectional view of FIG. 1, the drive 106 comprises a hollow wing section 108 at an outer side of the screw with a circular hollow core 110 and six hollow wings 112 which are arranged symmetrically along the circumference. This contour may also be denoted as internal hexalobular. Further, the drive 100 comprises a hollow cone section 114 at an inner side of the screw which defines a bottom of the drive 106.

At an axial transition between the hollow wing section 108 and the hollow cone section 114, the drive 100 comprises a chamfer section 116 whose outer surface 118 which can be seen in the cross-section is tilted and angled, respectively, with respect to an outer surface 120 of the hollow wing section 108 which can be seen in the cross-section, away from the screw axis, and with respect to an outer surface 122 of the hollow cone section 114 which can be seen in the cross-section, towards the screw axis. Extensions of the hollow wings 112 extend up into the chamfer section 116. In contrast to this, the hollow cone section 114 is free from hollow wings 112 and smooth. The hollow wings 112, from an end of the hollow wing section 108 at an outer side of the screw up the beginning of the chamfer section 116, have a constant outer diameter A. The hollow core 110 of the hollow wing section 108 is conically tapering at an inner side of the screw which can be seen by means of inclined surfaces 130. Insofar, the hollow wing section 108, except of the hollow wings 112, can be assumed as partially truncated cone shaped.

As can be easily seen by means of FIG. 1, also compare with a detail view 180 of the drive 106, and FIG. 1A, an opening angle α of a cone (see dashed line) which is extrapolated from the chamfer section 116 is larger than an opening angle β of a cone which is extrapolated from the hollow wing section 108 (in the detail view 180, β/2 can be seen). The opening angle β is for example approximately 12°, and may, more generally, for example be in a range between 5° and 20°. Further, an opening angle γ of the hollow cone section 114 is larger than the opening angle α of the cone which is extrapolated from the chamfer section 116. The outer surface 118 of the chamfer section 116 is located on an extrapolated cone (see dashed line) with the opening angle α of approximately 90°. The inclination of the outer surface 118 of the chamfer section 116 with respect to the vertical of FIG. 1 and with respect to the screw axis, respectively, thus is approximately 45°, such that it can be denoted as a 45°—chamfer. The opening angle γ of the hollow cone section 114 is approximately 140°. The inclination of the outer surface 122 of the hollow cone section 114 with respect to the vertical according to FIG. 1 and with respect to the screw axis, respectively, is therefore approximately 70°. The screw head 104 is a counter sunk head with an opening angle δ of approximately 90°. Therefore, the outer surface 118 runs approximately in parallel with respect to an outer surface of the screw head 104 which is formed as countersunk head.

From the plan view of FIG. 1, a hollow wing outer diameter A and a hollow wing inner diameter (or wing-core diameter) B can be taken. A ratio between the hollow wing outer diameter A and the hollow wing inner diameter B is approximately 1.45.

Figure 4:
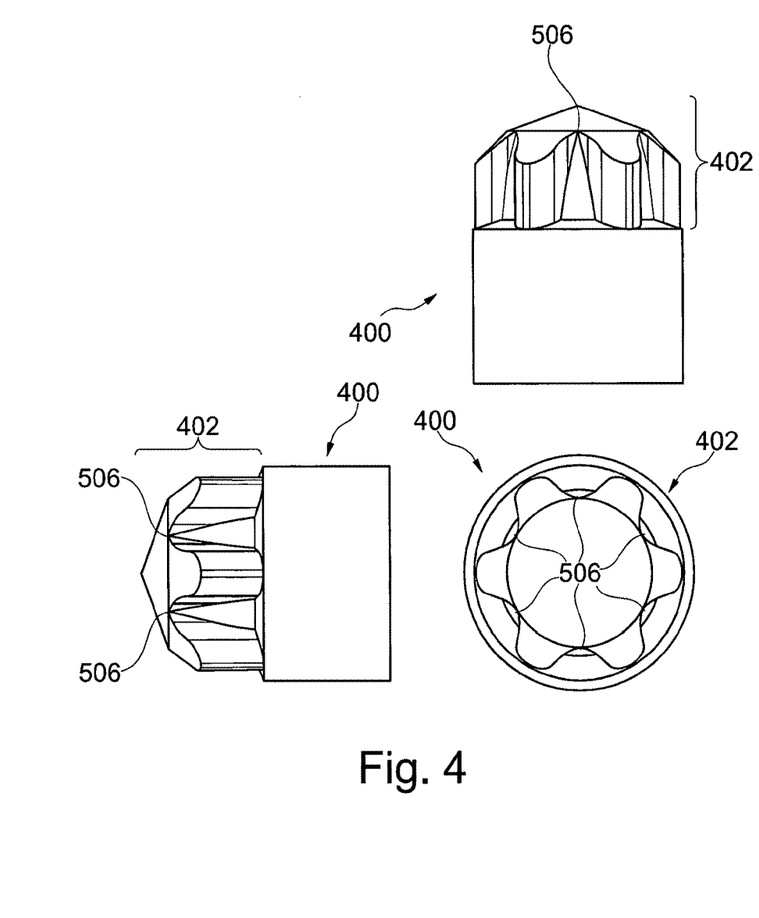
FIG. 4 shows a plan view and two side views of a tool for manufacturing a screw according to an exemplary embodiment of the invention.
Figure 5:
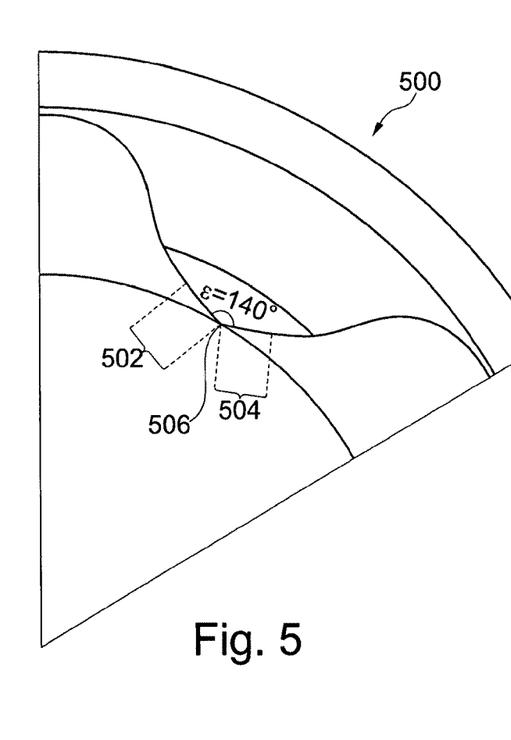
FIG. 5 shows an enlarged section of a wing forming profile of the tool according to FIG. 4 for forming hollow wings of a drive of a screw according to an exemplary embodiment of the invention.

When for manufacturing the screw 100 according to FIG. 1 and FIG. 1A, a tool 400 according to FIG. 4 and FIG. 5 is utilized, the hollow wings 112 at the location which is nearest to the center point have a wing edge 182 instead of an edge-free curvature. As will be described with reference to FIG. 4 and FIG. 5, thereby an undesired bearing of the drive element 600 on the bottom of the drive 106 in the screw head 104 can be prevented.

The screw 100 shown in FIG. 1 has an outer diameter of ø3.5 mm.

With respect to conventional screws concepts, with the screw 100, an axial elongation of the truncated cone like hollow wing section 108 can be achieved, wherein also the core diameter B (i.e. the inner diameter of the internal hexalobular profile) can be kept sufficiently small. Due to the fact that consequently the ratio A/B may assume a sufficiently large value of, for example, approximately 1.45 (may be in particular outside of tolerances larger than 1.4), the truncated cone at the front side at the tip may become descriptively radially smaller. This elongation can be adapted in the screw 100 to the same remaining bottom thickness and being compensated, respectively, by attaching the chamfer section 116 (corresponding to an opening angle α=90°), i.e. the chamfer of 45° with respect to an axial screw direction. This leads to an improved stability and guiding and centering of the screw 100 during a rotary actuation by the drive element 600, since the ratio of the penetration depth of the truncated cone with respect to the diameter of the truncated cone becomes larger at the tip. Further, an improved torque transmission occurs, since more force transmission surface is available. By an elongated forming of the central region of the drive element 600 which is formed as a bit, for example, the reduction of the B-measure and providing the chamfer section 118, therefore a high torque transmission from the drive element 600 to the screw 100 can be enabled (with a same penetration depth outside at the delimiting drive depth). By means of the elongation of the truncated cone, also an axial elongation of the hollow wings 112 with respect to the center line of the wing surface is accompanying, which further promotes the improved torque transmission. Thereby, also in a screw 100 which is relatively small with respect to the size of the drive, a safe guiding and centering of the screw 100 with a larger drive 106 (and with a larger bit size, respectively) can be achieved. By the radial and axial enlargement of the hollow wings 112, the drive element 600 (for example the bit) is protected from undesired shearing-off during screwing of large, long screws 100. A further advantage is that a screw 100 with the described drive 106 can also be driven by conventional bits (for example by conventional AW-bits). In addition, screwing such screws 100 by means of a TX-bit (Torx®) is possible.

A chamfer (with respect to a screw axis) at an end of the wing of the drive element 600 and the drive 106, respectively, is advantageous since it can be adapted to the form of a counter sunk head as screw head 104.

Figure 2:
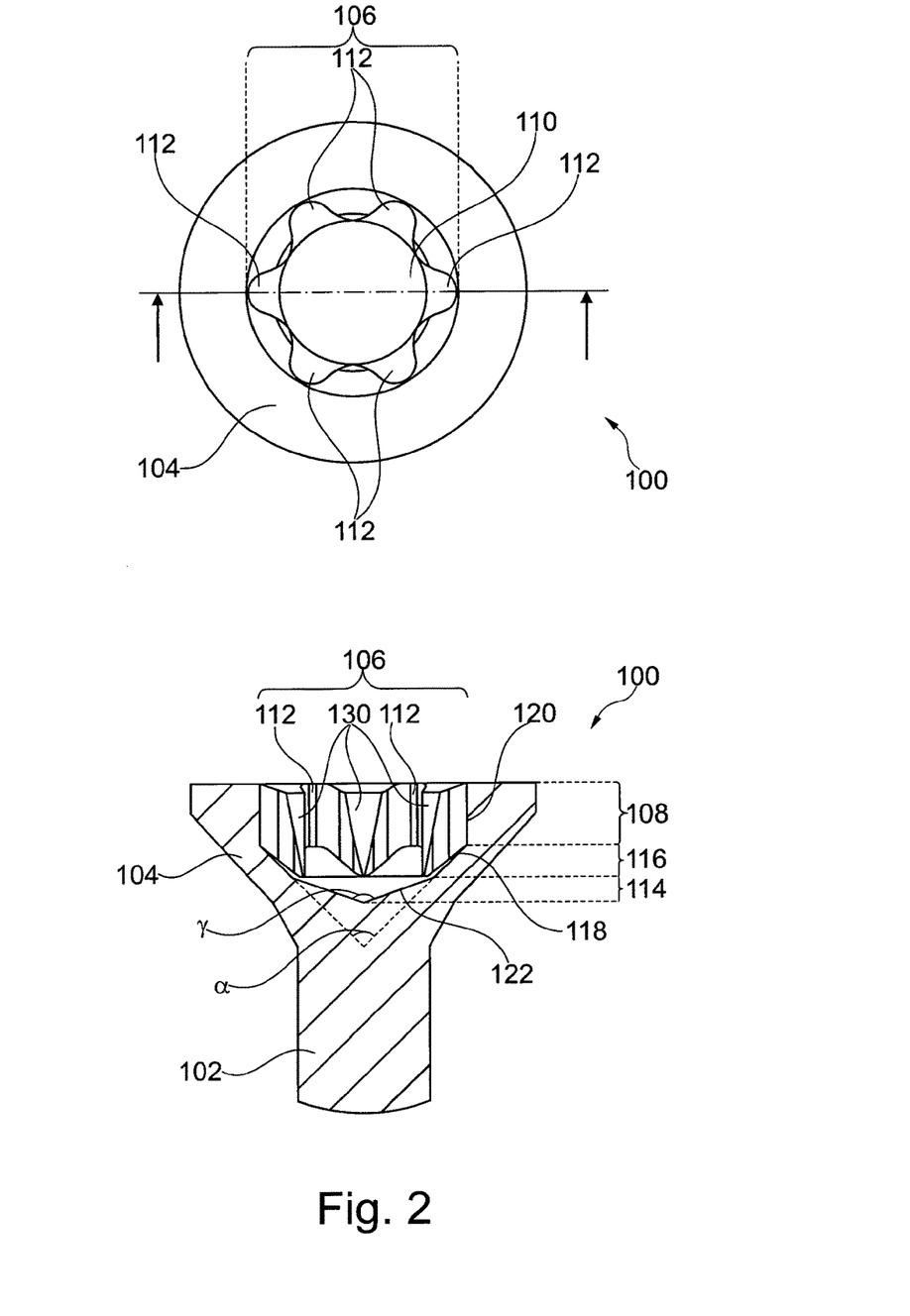
FIG. 2 shows a plan view and a cross-sectional view of a screw according to another exemplary embodiment of the invention.

FIG. 2 shows a plan view and a cross-sectional view of a screw 100 according to another exemplary embodiment of the invention. The screw 100 shown in FIG. 2 has an outer diameter of ø6 mm.

Figure 3:
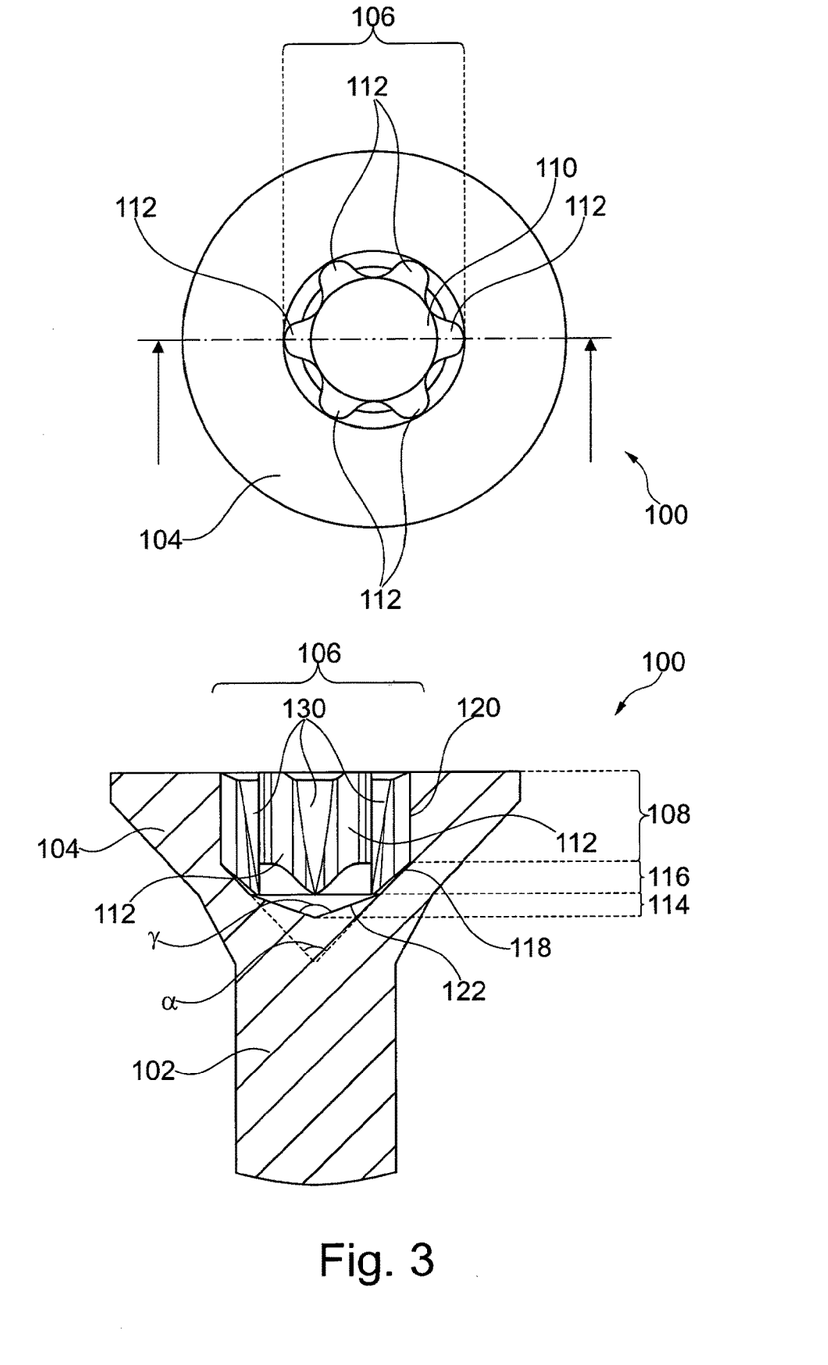
FIG. 3 shows a plan view and a cross-sectional view of a screw according to yet another exemplary embodiment of the invention.

FIG. 3 shows a plan view and a cross-sectional view of a screw 100 according to yet another embodiment of the invention. The screw 100 shown in FIG. 3 has an outer diameter of ø8 mm.

Figure 5A:
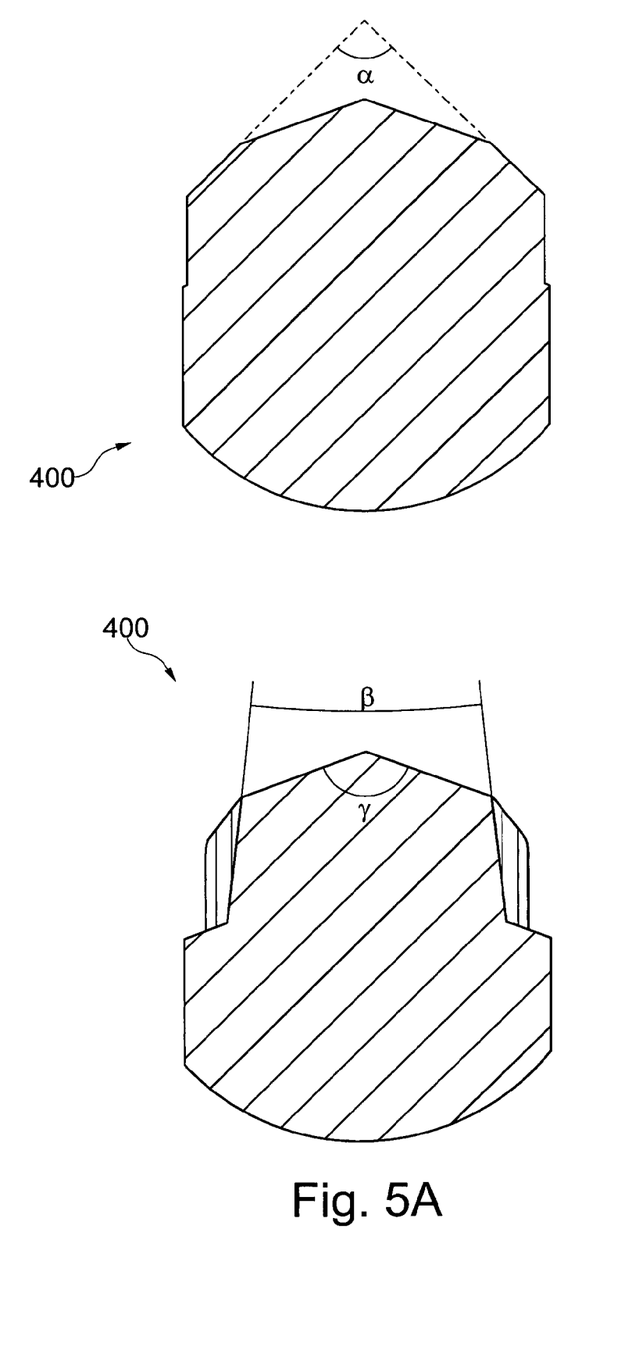
FIG. 5A shows an enlarged cross-sectional view of the tool according to FIG. 4.

FIG. 4 shows a plan view and two side views of a tool 400 for manufacturing a screw 100 according to an exemplary embodiment of the invention. FIG. 5 shows an enlarged section of a wing forming profile 500 of the tool 400 according to FIG. 4 for forming hollow wings 112 of a screw 100 according to an exemplary embodiment of the invention. FIG. 5A shows an enlarged cross-sectional-view of the tool 400 according to FIG. 4.

The tool 400 is used for forming a drive 106 with the geometry shown in FIG. 1 to FIG. 3 in a screw blank. This is carried out by a cold massive forming of material of the screw head 104 by the tool 400, optionally followed by a machining post-processing step. The form of a tool head 402 of the tool 400 therefore is substantially inverse to that of the drive 106 of the screw 100.

As described above, according to an exemplary embodiment of the invention, the B-measure according to FIG. 1 can be reduced with respect to a conventional screw with AW-drive. By means of this reduction of the B-measure, at an internal hexalobular-bit, under unfavorable circumstances, a bearing of the same in regions may occur, in which the drive 106 is not filled up to the conventional B-measure by means of the truncated cone. In order to suppress such a bearing (which can negatively influence the torque transmission to the screw 100 by the drive element 600), the wing width of the external hexalobulars can be widened, and under formation of an edge 506 instead of a circular radius of the conventional form, two straight-lined lines 502, 504 which together enclose an angle ε (of 140°, for example) with comparably small radiuses, which are tangential thereto, can be inserted.

The screw 100 with the described drive 106 allows a reduction of the B-measure, but is formable by extrusion with a low tool wear. With a drive 106 according to an exemplary embodiment, a large region of the reduced B-measure can be filled up again by the cone which is located inside. In the front region at the side of the tip, the ratio is reduced by attaching the chamfer. By merely reducing the B-measure, at an internal hexalobular bit, a bearing of the same would occur in the regions where the screw drive is not filled up to a previous B-measure. In order to prevent this bearing, the wing width of the external hexalobular can be increased and instead of the inner radius of the conventional form, two (preferably straight-lined or at least approximately straight-lined) lines 502, 504 (which together may enclose an angle of approximately 140°) can be inserted tangentially thereto in smaller radiuses. This is a further reason why widening the hollow wings 112 in the manner shown in FIG. 1 may be advantageous.

FIG. 6 shows two side views and a plan view of a drive element 600 which is formed as a bit for driving a screw 100 according to an exemplary embodiment of the invention.

The drive element 600 contains an insertion section 650 for inserting into a battery-powered screwdriver or that like, in order to rotary drive a screw 100 which is shown in FIG. 1 to FIG. 3 by means of a drive section 652 of the drive element 600, in order to introduce the screw 100 into an underground. Alternatively, the drive section 652 may also be formed as an end section of a wrench or a screwdriver not shown in the figure, which can be rotary operated at a handle by a user, in order to introduce the screw 100 into the underground.

The drive element 600 comprises a wing section 604 with a circular core 606 and six wings 608 provided along the circumference, a cone section 602 at an end side and a chamfer section 610 at a transition between the wing section 604 and the cone section 602. An outer surface 612 of the chamfer section 610 is angled with respect to an outer surface 614 of the wing section 604 and with respect to an outer surface 616 of the cone section 602. Extensions of the wings 608 extend up into the chamfer section 610. The cone section 602, in contrast, is free from wings 608 and smooth. The wings 608, from an end of the wing section 604 which is adjoining the insertion section 650 up to the beginning of the chamfer section 610, have a constant outer diameter. The core of the wing section 604, in contrast, is conically tapering towards the cone section 602.

An opening angle α' of a cone (see dashed line in the detail view 680) which is extrapolated from the chamfer section 610 is larger than an opening angle (this one substantially corresponds to the opening angle which is denoted as β in FIG. 1 and is not shown in FIG. 6) of a cone which is extrapolated from the wing section 604. An opening angle γ' of the cone section 602 is larger than the opening angle α' of the cone which is extrapolated from the chamfer section 610. The outer surface 612 of the chamfer section 610 thus is located on a cone with the opening angle α' of 90°. The opening angle γ' of the cone section 602 is 140° in the shown embodiment.

A ratio between a wing outer diameter A' and a wing inner diameter B' is approximately 1.45 in the shown embodiment.

A screw 100 according to FIG. 1 to FIG. 3 and a drive element 600 which is cooperating with it and rotary driving it, respectively, form an inventive arrangement and are adapted to each other, such that when the drive element 600 engages in the drive 106 of the screw 100, a direct contact between a boundary wall of the hollow cone section 114 and the cone section 602 mechanically made impossible and always a minimum distance of, for example, 0.2 mm to 0.4 mm remains between the tip of the drive element 600 and a bottom of the drive 106 of the screw 100. A thereby avoided contacting would negatively impair the guiding of the screw 100 by the drive element 600. The mentioned effect can be accomplished by a corresponding form and dimension of the screw 100 and the drive element 600.

Complementary, it should be noted that "comprising" does not exclude other elements or steps, and "a" or "an" does not exclude a multiplicity. Further, it should be noted that features or steps which are described with reference to one of the above embodiments can also be used in combination with other features or steps of other above described embodiments. Reference signs in the claims shall not be considered as limitation.

The invention claimed is:

1. A screw comprising:
    a screw shaft;
    a screw head which adjoins the screw shaft, in which a drive is formed for rotary driving the screw by means of a drive element;
    wherein the drive comprises a hollow wing section at an outer side of the screw with a circular hollow core and hollow wings provided along the circumference;
    wherein the drive comprises a hollow recess section at an inner side of the screw comprising a hollow cone section;
    wherein the drive at a transition between the hollow wing section and the hollow recess section comprises a chamfer section whose outer surface is angled with respect to an outer surface of the hollow wing section and with respect to an outer surface of the hollow recess section;
    wherein extensions of the hollow wings extend up into the chamfer section;
    wherein the hollow wings from an end of the hollow wing section at an outer side of the screw up to the beginning of the chamfer section have a constant outer diameter; and
    wherein the hollow core of the hollow wing section tapers conically towards the inner side of the screw such that a ratio between outer and inner diameters of a hexalobular profile of the hollow wings increases, in an axial direction from the screw head to the screw shaft, to a maximum value being larger than 1.42:1 and smaller than 1.60:1.

2. The screw according to claim 1, wherein the drive of the screw in a cross-sectional view has such a shape, that the drive originating from the hollow wing section at an outer side of the screw bends for a first time inwardly to the chamfer section which is directly adjoining, and originating from the chamfer section bends for a second time towards the hollow recess section at an inner side of the screw which is directly adjoining thereto, which hollow recess section in turn is running towards an end point at an inner side of the screw.

3. The screw according to claim 1, wherein the hollow recess section is free from hollow wings and comprises a smooth outer surface.

4. The screw according to claim 1, wherein an opening angle of a cone which is extrapolated from the chamfer section is larger than an opening angle of a cone which is extrapolated from the hollow wing section.

5. The screw according to claim 1, wherein an opening angle of the hollow recess section which is formed as hollow cone section is larger than an opening angle of a cone which is extrapolated from the chamfer section.

6. The screw according to claim 1, wherein the outer surface of the chamfer section is located on a cone with an opening angle in a range between 50° and 130°.

7. The screw according to claim 1, wherein an opening angle of the hollow recess section which is formed as hollow cone section is in a range between 100° and 170°.

8. The screw according to claim 1, wherein at a radially innermost section of at least a part of the hollow wings, a respective wing edge is formed, wherein the wing edge is formed by two surface sections which are abutting against each other and which are free from curvature at a border region with a wing edge angle in a range between 120° and 160°.

9. The screw according claim 1, wherein the screw head is a counter sunk head or a fillister head.

10. The screw according to claim 1, wherein the screw is a self-drilling or a self-cutting screw.

11. A drive element comprising:
    a wing section with a circular core and wings provided along the circumference;
    a recess section at an end side comprising a cone section;
    a chamfer section at a transition between the wing section and the recess section, wherein an outer surface of the chamfer section is angled with respect to an outer surface of the wing section and with respect to an outer surface of the recess section;
    wherein the wings from an end of the wing section which is facing away from the drive of the screw in the rotary operation up to the beginning of the chamfer section have a constant outer diameter;
    wherein the core of the wing section tapers conically towards the recess section such that a ratio between outer and inner diameters of a hexalobular profile of the wing sections increases, in an axial direction of the drive element towards a tip of the drive element, to a maximum value being larger than 1.42:1 and smaller than 1.60:1.

12. The drive element according to claim 11, wherein an opening angle of a cone which is extrapolated from the chamfer section is larger than an opening angle of a cone which is extrapolated from the wing section.

13. The drive element according to claim 11, wherein an opening angle of the recess section which is formed as cone section is larger than an opening angle of a cone which is extrapolated from the chamfer section.

14. The drive element according to claim 11, wherein the outer surface of the chamfer section is located on a cone with an opening angle in an range between 50 ° and 130.

15. The drive element according claim 11, wherein an opening angle of the recess section which is formed as a cone section is in a range between 100° and 170°.

16. The drive element according to claim 11, wherein at a radially innermost section of at least a part of the wings a respective wing edge is formed, wherein the wing edge is formed by two surface sections which are abutting against each other and which are free from curvature at a border region with a wing edge angle in a range between 120° and 160°.

17. The drive element according to claim 11, wherein the drive element is configured as a bit, as a wrench or as a screwdriver.

18. An arrangement for introducing a screw into an underground, wherein the arrangement comprises:
    a screw which is formed according to claim 1; and
    a drive element according to claim 11 for rotary driving the screw for introducing the screw into the underground.

19. The arrangement according to claim 18, wherein the screw and the drive element are adapted to each other, such that, when engaging the drive element into the drive of the screw, a direct contact of a boundary wall of the hollow recess section is made impossible by means of the recess section.

20. A method for introducing a screw according to claim 1 into an underground by a drive element according claim 11, wherein the method comprises:
    engaging the hollow wings of the hollow wing section of the screw with the wings of the wing section of the drive element;
    engaging the extensions of the hollow wings in the chamfer section of the screw with the extensions of the wings of the chamfer section of the drive element;
    rotary driving the screw by means of the drive element.

21. The drive element according to claim 11, wherein extensions of the wings extend up into the chamfer section.

22. The drive element according to claim 11, wherein the recess section is free from wings and comprises a smooth outer surface.

* * * * *